(12) United States Patent
Arrasvuori et al.

(10) Patent No.: US 8,890,818 B2
(45) Date of Patent: Nov. 18, 2014

(54) APPARATUS AND METHOD FOR PROXIMITY BASED INPUT

(75) Inventors: Juha Arrasvuori, Tampere (FI); Ollila Elina, Helsinki (FI)

(73) Assignee: Nokia Corporation, Espoo (FI)

(*) Notice: Subject to any disclaimer, the term of this patent is extended or adjusted under 35 U.S.C. 154(b) by 664 days.

(21) Appl. No.: 12/887,539

(22) Filed: Sep. 22, 2010

(65) Prior Publication Data

US 2012/0068941 A1 Mar. 22, 2012

(51) Int. Cl.
*G06F 3/041* (2006.01)
*G06F 3/0488* (2013.01)

(52) U.S. Cl.
CPC .. *G06F 3/04883* (2013.01); *G06F 2203/04803* (2013.01); *G06F 2203/04101* (2013.01)
USPC ......................................................... 345/173

(58) Field of Classification Search
CPC .......................... G06F 3/04883; G06F 3/04886
USPC ............ 345/156, 173, 157; 455/566; 715/863
See application file for complete search history.

(56) References Cited

U.S. PATENT DOCUMENTS

| 7,411,575 | B2 | 8/2008 | Hill et al. | |
|---|---|---|---|---|
| 2008/0165140 | A1 | 7/2008 | Christie et al. | |
| 2009/0165073 | A1* | 6/2009 | Stallings | 725/131 |
| 2009/0237371 | A1* | 9/2009 | Kim et al. | 345/173 |
| 2009/0239588 | A1* | 9/2009 | Nam | 455/566 |
| 2009/0265670 | A1* | 10/2009 | Kim et al. | 715/863 |
| 2009/0295715 | A1* | 12/2009 | Seo et al. | 345/156 |
| 2010/0099462 | A1* | 4/2010 | Baek et al. | 455/566 |
| 2010/0110002 | A1* | 5/2010 | Burstrom et al. | 345/157 |
| 2010/0222112 | A1* | 9/2010 | Han | 455/566 |

FOREIGN PATENT DOCUMENTS

| EP | 2 104 019 A2 | 9/2009 |
|---|---|---|
| EP | 2 128 748 A2 | 12/2009 |
| EP | 2 131 272 A2 | 12/2009 |
| EP | 2 138 929 A2 | 12/2009 |
| KR | 2009-0116591 A | 11/2009 |
| WO | WO 2006/039939 A1 | 4/2006 |

OTHER PUBLICATIONS

International Search Report for Application No. PCT/FI2011/050762 dated Dec. 27, 2011.
Davidson, Philip., et al. *Extending 2D Object Arrangement with Pressure-Sensitive Layering Cues;* UIST '08 Proceedings of the 21st annual ACM symposium on User interface software and technology; Oct. 2008; pp. 87-90.
Hilliges, Otmar, et al., *Interactions in the Air: Adding Further Depth to Interactive Tabletops;* UIST '09 Proceedings of 22nd ACM Symposium on the User Interface and Software Technologies; Oct. 2009; pp. 139-148.

* cited by examiner

*Primary Examiner* — Amare Mengistu
*Assistant Examiner* — Jennifer Zubajlo
(74) *Attorney, Agent, or Firm* — Alston & Bird LLP

(57) ABSTRACT

In accordance with an example embodiment of the present invention, a method is provided for controlling display operations is provided, comprising: detecting presence of an object in close proximity to an input surface, detecting at least one information item associated with the object, detecting distance information on the distance of the object to the input surface, and controlling selection of additional information associated with the at least one information item for display on the basis of the distance information.

20 Claims, 5 Drawing Sheets

Determine or receive relevancy information associated with information item indicated by hovering input — 500

Select additional information item(s) for display on the basis of relevancy information — 510

APPARATUS AND METHOD FOR PROXIMITY BASED INPUT

FIELD

The present invention relates to an apparatus and a method for proximity based input.

BACKGROUND

Touch screens are used in many portable electronic devices, such as PDA (Personal Digital Assistant) devices, tabletops, and mobile devices. Touch screens are operable by a pointing device (or stylus) and/or by a finger. Typically the devices also comprise conventional buttons for certain operations.

Lately, so-called hovering user interfaces have been proposed for devices with touch screens. Hovering refers generally to inputs by an object, such as a finger, in close proximity to a user interface input surface, but not touching the input surface. Thus, also the space above a touch screen surface may be used as further means for user inputs. For instance, the user interface can be arranged to react to finger hovering by popping up a menu. The desired item on the menu may then be selected touching the screen. People who are using mobile devices generally wish to have more versatile and intuitive ways to interact with their devices.

SUMMARY

Various aspects of examples of the invention are set out in the claims.

According to an aspect, an apparatus is provided, comprising at least one processor; and at least one memory including computer program code, the at least one memory and the computer program code configured to, with the at least one processor, cause the apparatus at least to perform: detect presence of an object in close proximity to an input surface, detect at least one information item associated with the object, detect distance information on the distance of the object to the input surface, and control selection of additional information associated with the at least one information item for display on the basis of the distance information.

According to another aspect, a method is provided, comprising: detecting presence of an object in close proximity to an input surface, detecting at least one information item associated with the object, detecting distance information on the distance of the object to the input surface, and controlling selection of additional information associated with the at least one information item for display on the basis of the distance information.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1A:
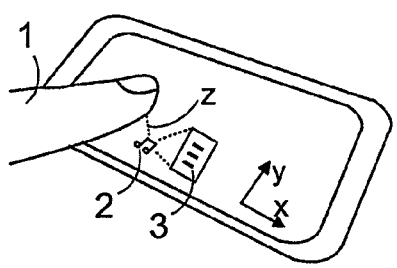
FIGS. 1a and 1b illustrate a user interface interaction and display control example.
Figure 1B:
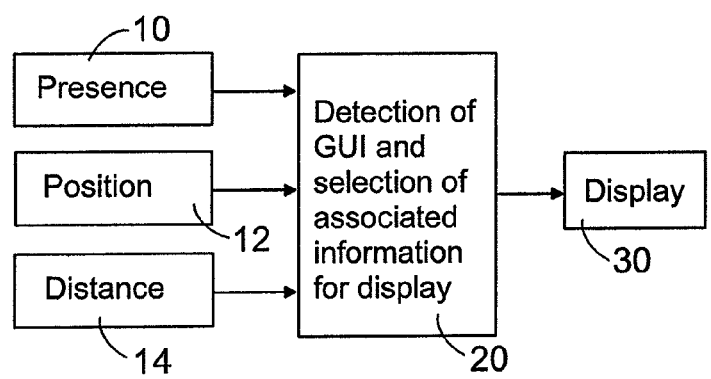

FIGS. 1a and 1b illustrate general principles of a hovering based display control according to some embodiments. Hovering refers generally to introduction of an input object 1, such as a finger or a stylus, in close proximity to, but not in contact with, an input surface, such as an input surface of a touch screen. Reference "z" in FIG. 1a illustrates the distance of the object 1 from the screen surface, which may also be referred to as "hovering distance". X and y directions are generally substantially parallel to the input surface, and the z direction is substantially normal to input surface.

As further illustrated in FIG. 1b, presence of the object 1 in close proximity is detected 10 and indicated to a display controller 20 selecting information for display and controlling a display. When such hovering object 1 is detected, the x, y position 12 of the object 1 may be defined. Based on the position of the object 1, at least one associated information item, for example a view, a, window, at least one GUI icon of a file, a folder, contact entry, link, or an application, may be detected or selected. Distance (z) of the object 1 to the input surface may be estimated 14.

Additional information 3 related to the currently associated information item 2 may be displayed. Based on the detected distance information 14, the controller 20 may control the selection of additional information, associated with the at least one information item, for display. This is to be broadly understood to refer to any kind of control operations causing display of additional information related to the information item(s) of interest to adapt on the basis of changes in the hovering distance. This may involve adapting a number of related information items for display, controlling display of additional information on and off, or the level of detail of further information, for example. The information selected for display may be e.g. text, GUI elements, animation, video, or any combination thereof. The controller 20 may thus be arranged to control display of a further GUI item 3, such as a preview window, providing further information related to the displayed information item 2. For example, when the object 1 is brought closer to the touch screen surface, further details regarding the information item may be displayed, e.g. by displaying a new application view, a window or further information in current view. When the distance of object 1 is detected to increase, less supplementary information 3 may be displayed. This user interface input arrangement provides an easy and intuitive interaction option to get further information of a GUI element under interest.

Figure 2:
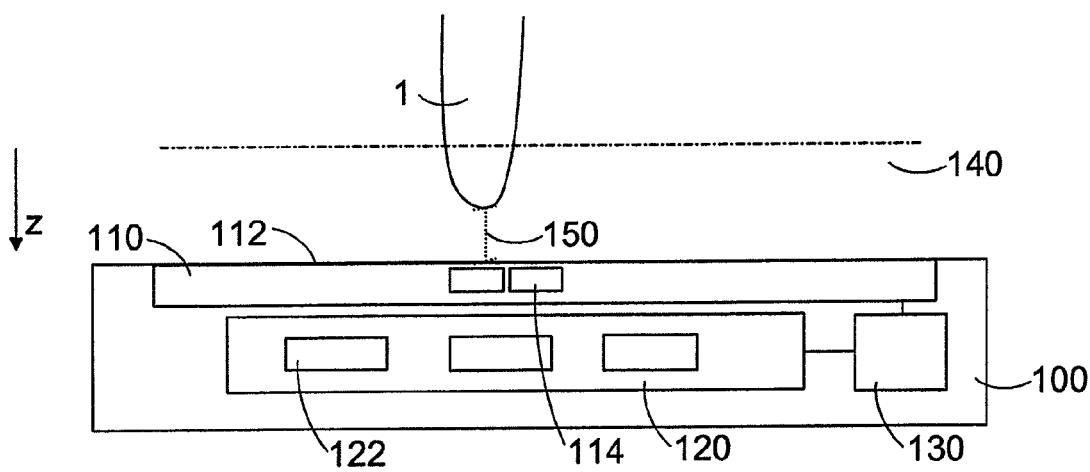
FIG. 2 is simplified block diagram of a side view of an input apparatus in accordance with an example embodiment of the invention.

FIG. 2 illustrates an apparatus 100 with one or more input and/or output devices according to an example embodiment. The input devices may for example be selected from buttons, switches, sliders, keys or keypads, navigation pads, touch pads, touch screens, and the like. The output devices may be selected from displays, speakers, indicators, for example.

The apparatus comprises a display 110 and a proximity detection system or unit 120 configured to detect when an input object 1, such as a finger or a stylus, is brought in close proximity to, but not in contact with, an input surface 112. The input surface 112 may be a surface of a touch screen or other input device of the apparatus capable of detecting user inputs.

A sensing area 140 may illustrate the approximate area and/or distance at which an input object 1 is detected to be in close proximity to the surface 112. The sensing area 140 may also be referred to as a hovering area and introduction of an input object 1 to the hovering area and possible further (non-touch) inputs by the object 1 in the hovering area may be referred to as hovering. In some embodiments the hovering area 140 enables also inputting and/or accessing data in the apparatus 100, even without touching the input surface 112. A user input, such as a particular detected gesture or even mere introduction of the input object, in the hovering area 140 detected at least partly based on the input object 1 not touching the input surface 112 may be referred to as a hovering input. Such hovering input is associated with at least one function, for instance selection of an UI item or activation of a pop-up menu.

The apparatus 100 may be a peripheral device, such as a keyboard or mouse, or integrated in an electronic device. Examples of electronic devices include any consumer electronics device like computers, media players, wireless communications terminal devices, and so forth.

In some embodiments, a proximity detection system 120 is provided in an apparatus comprising a touch screen display. Thus, the display 110 may be a touch screen display 110 comprising a plurality of touch sensitive detectors 114 to sense touch inputs to the touch screen input surface.

In some embodiments the detection system 120 generates a sensing field by one or more proximity sensors 122. In one example embodiment a capacitive proximity detection system is applied, whereby the sensors 122 are capacitive sensing nodes. Disturbances by one or more input objects 1 in the sensing field are monitored and presence of one or more objects is detected based on detected disturbances. A capacitive detection circuit detects changes in capacitance above the input surface 112.

However, it will be appreciated that the present features are not limited to application of any particular type of proximity detection. The proximity detection system 120 may be based on infrared proximity detection, optical shadow detection, acoustic emission detection, ultrasonic detection, radar technology, or any other suitable proximity detection technique. For instance, in case the proximity detection system 120 would be based on infrared detection, the system would comprise one or more emitters sending out pulses of infrared light. One or more detectors would be provided for detecting reflections of that light from nearby objects 1. If the system detects reflected light, then an input object is assumed to be present.

The proximity detection system 120 is coupled to a controller 130. The proximity detection system 120 is configured to provide the controller 130 with signals when an input object 1 is detected in the hovering area 140. Based on such input signals, commands, selections and other types of actions may be initiated, typically causing visible, audible and/or tactile feedback for the user. Touch inputs to the touch sensitive detectors 114 may be signaled via a control circuitry to the controller 130, or another controller.

The proximity detection system 120 may also be arranged to provide information on/for determining x, y position of the object 1 for the controller 130 to enable determination of a target UI item or area of a hovering object 1.

The apparatus 100 may be arranged to estimate the distance 150 of the input object 1 to the input surface 112, i.e. the hovering distance, enabling to provide z coordinate data of the location of the object 1 in relation to the input surface. The distance may be detected by the proximity detection system 100 or on the basis of a signal provided by the proximity detection system 100. In some embodiments one or more further devices are applied to assist in estimation of the distance. For example, the apparatus may be configured to detect the distance on the basis of information from at least one of a video camera, a light level sensor, or an ultrasound sensor.

Depending on the proximity detection technique applied, the size of the apparatus 100 and the input surface 112, and the desired user interaction, the hovering area 140 may be arranged to extend from the input surface 112 by distance selected from some millimeters to even up to multiple dozens of centimeters, for instance. The proximity detection system 120 may be arranged to detect also further parts of user's hand, and the system may be arranged to recognize false inputs and avoid further actions.

The controller 130 may also be connected to one or more output devices, such as the touch screen display 110. The controller 130 may be configured to control different application views on the display 110. The controller 130 may detect touch inputs and hovering inputs on the basis of the signals from the proximity detection system 120 and the touch sensitive detectors 114. The controller 130 may then control a display function associated with a detected touch input or hovering input. A broad range of functions is available for selection to be associated with an input detected by a touch sensitive detection system and/or the proximity detection system 120. The controller 130 may be configured to adapt the associations according to a current operating state of the apparatus 100, a user input or an application executed in the apparatus 100, for instance. For instance, associations may be application specific, menu specific, view specific and/or context (which may be defined on the basis of information obtained from the current environment or usage of the apparatus 100) specific.

The controller 130 may be configured to control the selection of additional information, regarding the current x, y position of the input object, for display depending on the current hovering distance 150.

In one embodiment, the apparatus 100 may be arranged to estimate the distance 150 between the input object 1 and the input surface 112, and the controller 130 may compare the estimated distance to one or more predetermined threshold values. Each of the threshold values may be associated with a specific level of detail. For example, display of a first set of information items associated with the at least one information item may be controlled in response to receiving information indicating that the object has a first distance to the input surface. Selection and display of a second set of information items associated with the at least one information item may then be controlled in response to receiving a signal indicating that the object has approached the input surface by a given threshold or is within a second distance to the input surface.

Thus, the controller 130 may be arranged to monitor the change in the hovering distance. In response to detecting the hovering distance to change by a threshold, display of the additional information may be triggered or adapted. Parameter/setting data guiding the operation of the controller 130 selecting the additional information may be stored in a memory comprised or connected to the controller 130. The user may be provided with an option to set the display of the additional information while hovering on and off, and/or adapt one or more settings affecting the selection of the additional information, e.g. to affect sensitivity of the user interface to (introduction/movement of) hovering objects.

It will be appreciated that the example apparatus 100 may comprise various further elements not discussed in detail herein. Although the apparatus 100 and the controller 130 are depicted as a single entity, different features may be implemented in one or more physical or logical entities. There may be further specific functional module(s), for instance for carrying out one or more of the blocks described in connection with FIG. 3 or 5. In one example variation, the proximity detection system 120 and the input surface 112 are positioned further away from the display 110, e.g. on side or back (in view of the position of a display) of a handheld electronic device.

Figure 3:
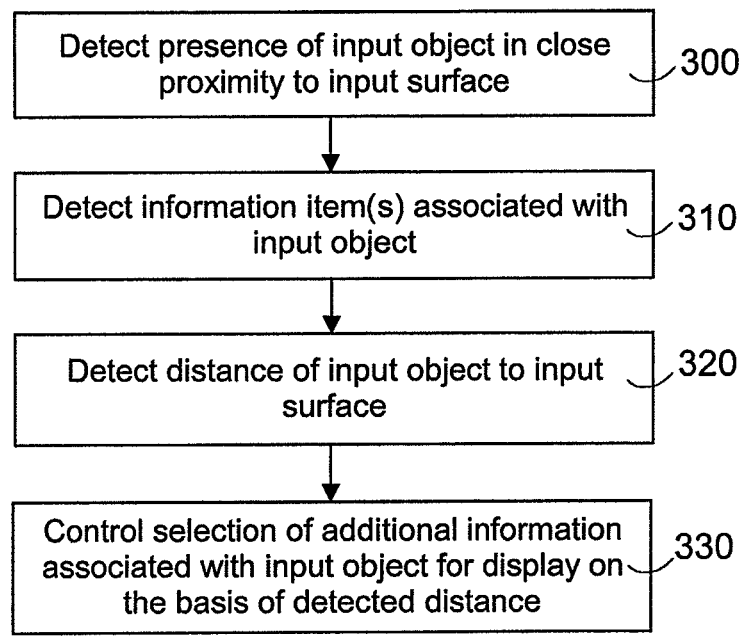
FIG. 3 illustrates a method according to an example embodiment of the invention.

FIG. 3 shows a method for controlling display operations according to an example embodiment. The method may be applied as a control algorithm by the controller 130, for instance. In block 300 presence of an object in close proximity to an input surface is detected. At least one information item associated with currently detected position of the object is detected 310, for example by determining an associated GUI on the basis of the current x, y position information of the object 1. Distance information on distance of the object to the input surface is detected 320. For example, an estimate on the distance may be obtained by a signal from the proximity detection system 120. The selection of additional information, associated with the at least one information item, for display is controlled 330 on the basis of the distance information. Thus, the amount of information displayed for the user may be adapted on the basis of the hovering distance.

It will be appreciated that various modifications and additions may be made in the procedure illustrated in the simplified FIG. 3. In one example variation of FIG. 3, the distance of the hovering object 110 may be continuously monitored (320) regardless of the detection of association (310) of the object to any information item. Some further example embodiments will be illustrated below.

In one embodiment, with reference also to FIG. 3, one or more further triggers or conditions are applied before displaying 330 the further information. For instance, the controller 130 may be arranged to monitor the time the object 1 is maintained on the (x, y) area associated with the information item, and trigger the display only in response to detecting the object 1 associated with the information item for a predetermined time period. Thus, it may be possible to get further information related to a GUI item by maintaining a finger hovering above the item. By applying such delay condition, it becomes possible to avoid or at least reduce during hovering display of additional information which the user actually is not interested on.

In some embodiments, the apparatus is in block 330 configured to activate display of and/or adapt selection of information in a preview, recommendation or a supplementary information window associated with the information item on the basis of the estimated distance. Such window may thus be displayed to provide additional information with variable level of detail on the information item under interest for the user. The window may be static or dynamic. The size of the window and the amount of content in the window may be varied in accordance with the currently detected distance. The window may be of various forms. For example, instead of traditional windows and menus, the window could be a bubble. The appearance and/or position of the window may be adapted on the basis of time elapsed and/or in response to detected user actions, such as movement of finger or a gesture. The window, such as a preview, may be arranged in the same display view as the GUI element being hovered. However, in some cases the window could be displayed in the background of the screen, in a secondary display or as an overlay. For example, if the apparatus 100 is connected to a projector or has a dual screen, the window could be displayed in the secondary display. However, it will be appreciated that there are numerous possibilities for arranging the display of additional information triggered by hovering, and only some examples are illustrated herewith.

Figure 4A:
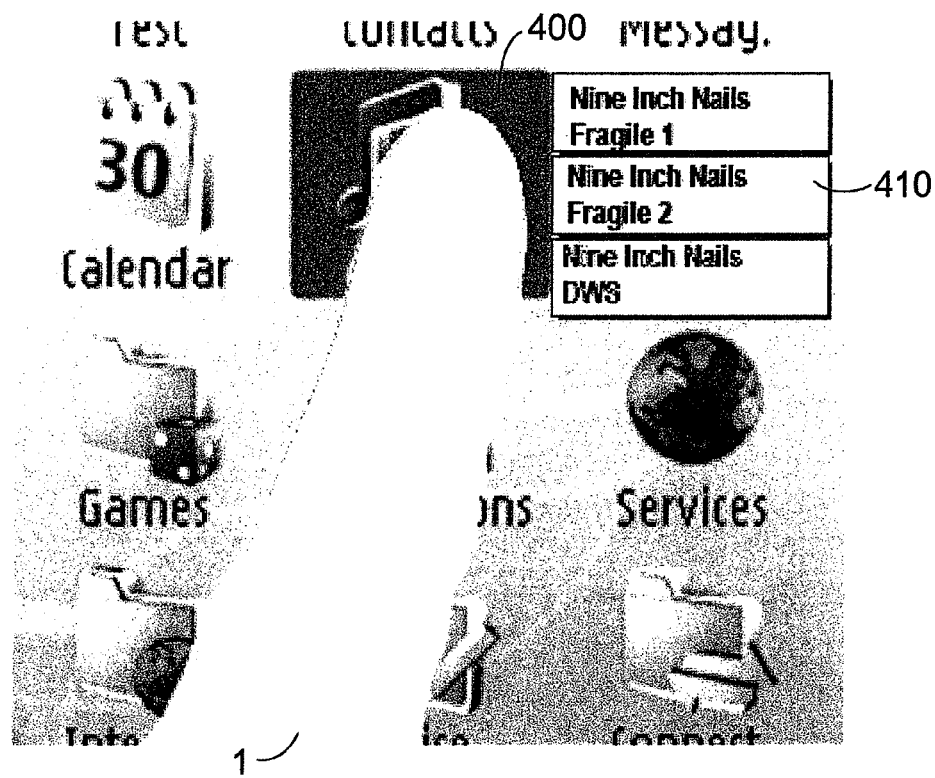
FIGS. 4a and 4b illustrate a user interface interaction sequence example.
Figure 4B:
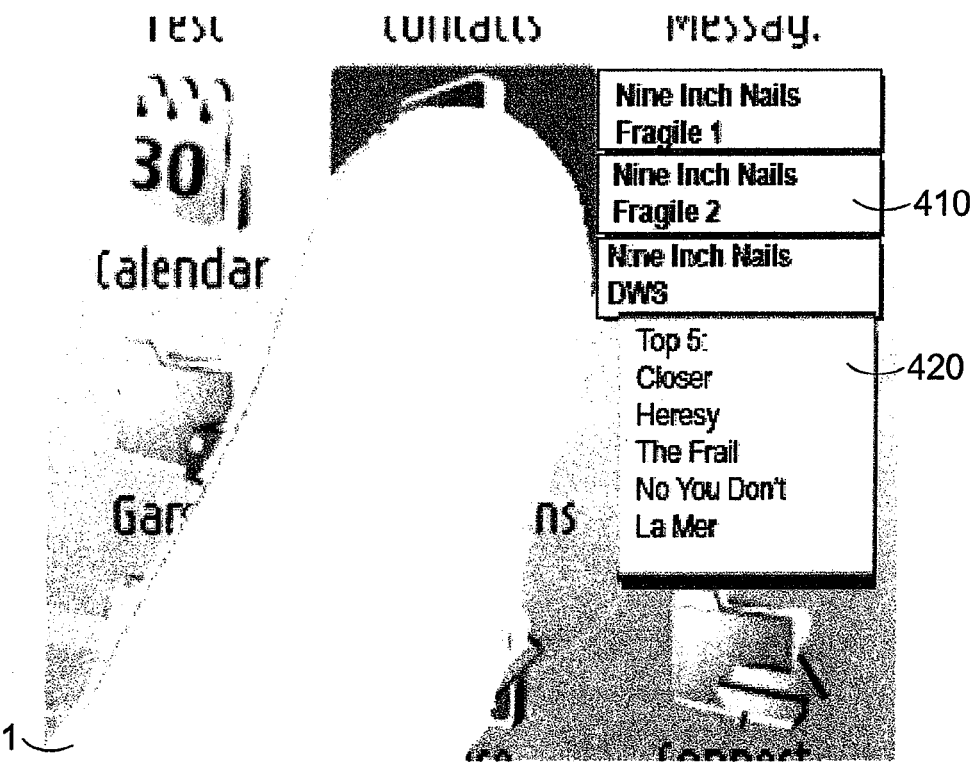

In some embodiments, as illustrated in the example of FIG. 4a, a folder icon 400 is detected to be associated with the input object. For example, a view with a set of folders may be displayed, each folder containing several files. A finger is detected in the hovering area above a currently displayed folder icon for a predetermined time period. A window 410 providing further information on the files of the folder may thus be displayed. The number of files (among all files of the folder) displayed in the window 410 may be controlled based on the detected distance of the object to the input surface. The user may get a more detailed view 420 of the content of the folder by moving his finger further towards the icon 400. As illustrated in FIG. 4b, a further view 420 may be displayed in response to detecting the finger closer to the icon 400.

In some embodiments, one or more further actions regarding the associated information item are controlled on the basis of the current distance 150 of the object 1 to the input surface 112. This may be carried out in addition or instead of controlling, for display, the selection of further information associated with the information item. For example, an application is activated, a user prompt is generated, audible and/or tactile output is generated. In one embodiment one or more information items amongst currently displayed plurality of information items are selected on the basis of the hovering distance 150. For example, one of the items in the additional view 3, 410, 420 may be focused and selected based on the distance. Another example is that a GUI element among a plurality of GUI elements is selected on the basis of the estimated distance of the input object to the input surface, e.g. the appearance of the icon 2 of FIG. 1a is changed in response to the object further approaching the input surface. In one embodiment, in case the information item currently associated with the input object is a media file, a media player is activated to output a preview and/or playback of the media file.

There may be further parameters affecting the selection of information items for display. In some embodiments the selection of information for display is controlled based on relevancy of available information items.

Figure 5:
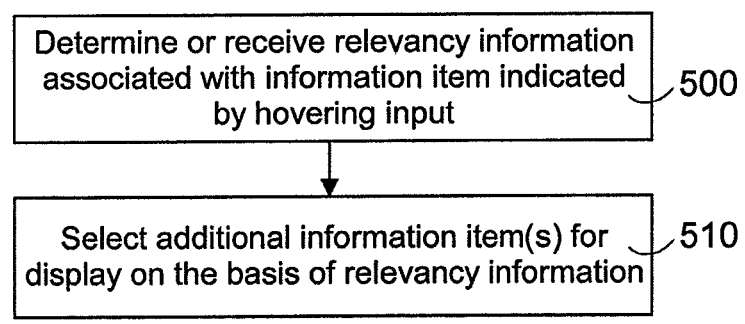
FIG. 5 illustrates a method according to an example embodiment of the invention.

As illustrated in FIG. 5, in block 500 relevancy information associated with the at least one information item or one or more further information items associated with the at least one information item is detected or determined. Thus, the apparatus 100 may be arranged to itself generate relevancy information on the basis of metadata associated with the information item(s) available for the apparatus, or receive relevancy information from other devices.

The information for display may be selected 510 in accordance with the relevancy information. Thus, it becomes possible to provide most relevant further information for the user indicating his interest by maintaining the finger on top of the information item. This enables to provide a more convenient way of searching for relevant information items e.g. among tens or hundreds of files in one or more folders.

For example, referring also to FIGS. 4a and 4b, the information items for the additional views 410, 420 may be selected on the basis of relevancy values of each of the available information items. For example, records with highest relevancy values amongst the records in the folder represented by the icon 400 may be displayed in the additional views 410, 420.

Various methods may be applied to determine 500 relevancy information for an information item or a set of information items. In one embodiment the relevancy information may be determined on the basis of examining access history indicating use activity of the information item(s). For example, the apparatus 100 may be arranged to store access history regarding user's files store or referred to in the memory of the apparatus 100. In one embodiment, relevancy information may be updated on the basis of hovering inputs. For example, if a user maintains his finger for a long time over an information item, the relevancy of the information item may be increased.

Such access history or relevancy information may be also maintained regarding a set of other users defined in contact information stored in the apparatus. For example, such files (or copies/instances of the files) stored in the folder that the user's friends have accessed the most and/or accessed most recently are defined as most relevant files of the folder.

Figure 6:
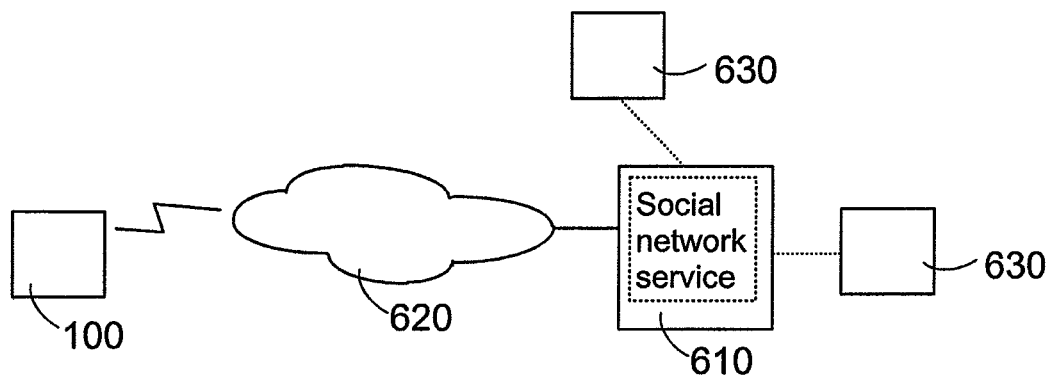
FIG. 6 illustrates entities for a social network system.

In one embodiment, the relevancy of a file is determined by examining a user's social network. With reference to the example of FIG. 6, social networks between people and their usage of files and other information may be stored by an online service on a server or database 600, which the apparatus 100 may be arranged to access via one or more networks 620. The relevancy information or information for determining the relevancy of friend's usage of files could also be pushed to the client device during downtime, e.g. each night. The relevancy of a file may be determined on the basis of recommendations received by the server from devices 630 of users' belonging to the associated social network. Thus, socially recommended content may be provided in a view 410, 420 controlled on the basis of the detected hovering distance 150, and a user can more easily find content items currently of interest to the social network.

As a further example, in case a finger is hovering above a folder containing music files, the apparatus 100 may be arranged to detect which song the user's friends have listened to the most. The icon of such song is additionally displayed and the playback of the song may be started. If the file would be a video clip, the apparatus could be arranged to show a preview of it. In one further example option, the preview of the song or video may be arranged to begin from the section where the user's friend ended listening to or watching the video. In one example related to video game applications, the user's friends' recent high scores could be displayed next to/on top of the game application icon. In one embodiment, the relevancy information associated with an information item is controlled (330) for display as additional information in response to the object 1 hovering above a GUI element of the information item. For example, Stephen has accessed a song, the GUI of which is being hovered, 15 times.

In one example embodiment, the apparatus 100 is configured to control selection of additional information items on basis of further properties associated with movement of the input object 1 in the hovering area 140. For example, the apparatus 100 is arranged to detect the speed of the movement of the object 1. The selection of additional information items may be controlled 330 on the basis of speed of the movement of the object 1.

In one embodiment, the apparatus 100 is arranged to support use of multiple fingers to provide touch and/or hovering based inputs simultaneously. For example, one finger may be used to select or focus to an information item and another finger may be used to select or focus another information item. Distances of the one or more of the hovering fingers may be estimated, and the amount of additional information for each of the associated information items may be controlled based on the currently detected distance of the associated finger. For example, the distance of one hovering finger may be used to control selection of a folder from several available folders, and the distance of another simultaneously hovering finger may be used to select the song from within the chosen folder.

Figure 7:
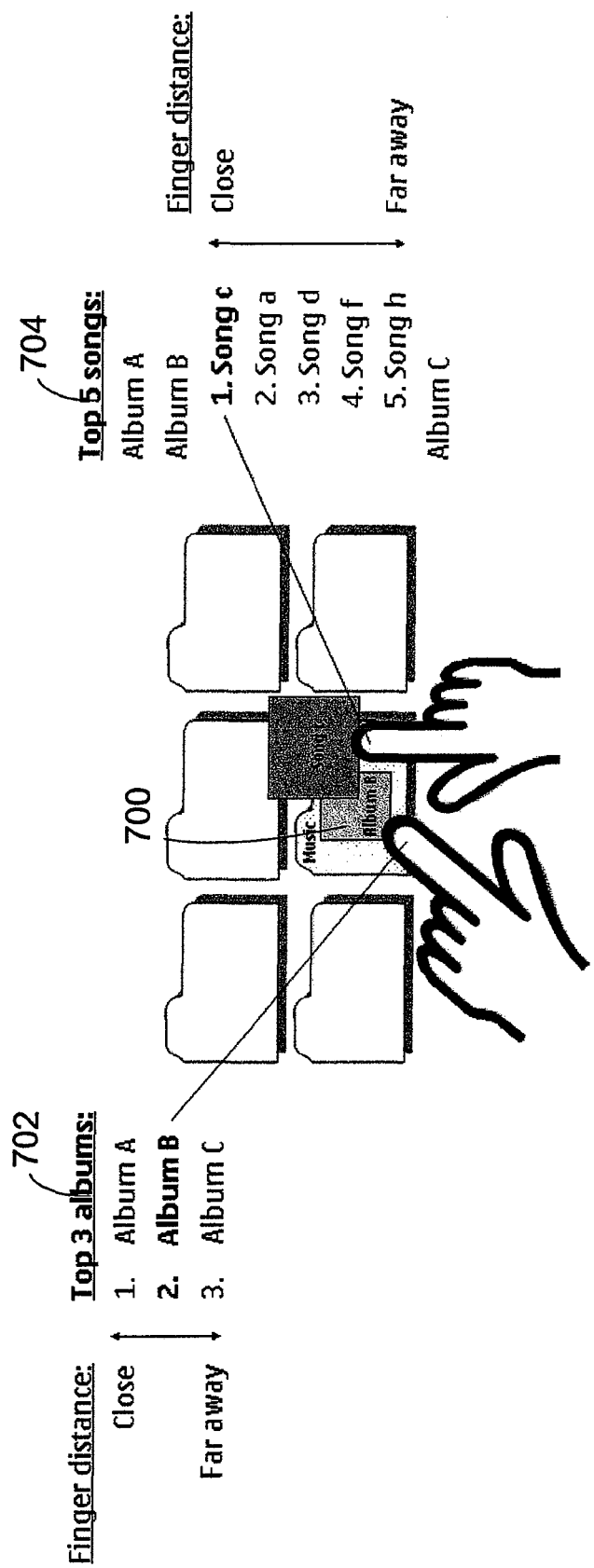
FIG. 7 illustrates a user interface example.

FIG. 7 illustrates an example of using multiple fingers to get previews or recommendations of information associated with GUI items. A user may wish to have recommendations of files stored in a folder 700, which contains several subfolders, in this example music albums, which in turn contain several music files each. In the example of FIG. 7, the available information is further pre-screened on the basis of relevance information. The distance of a left-hand finger may determine which of e.g. the Top 3, which may be socially the most relevant, album folders 702 is selected. The distance of a right-hand finger may determine which of the Top 5, e.g. socially the most relevant, song files 704 from the album currently chosen with the left-hand finger is selected for preview.

It will be appreciated that the configuration between selection and left/right hand fingers, the distance levels, and the number of selectable items can be changed in various ways for the embodiment illustrated in FIG. 7, as well as for the other embodiments.

In another example embodiment, the controller 130 is arranged to control a specific function in response to detecting specific combined use of multiple fingers, such as a specific hovering or touch-based pinch or receding gesture. Such specific input may be further applied to control display operations, e.g. in step 330.

In one example embodiment, properties of the input object (s) associated with the detected input are determined and applied for controlling display operations, e.g. in step 330. For instance, identification information on user's hand, such as fingers and/or wrist, is determined to enable identification of the user of the source device from other users. Some example properties of user's hand include, but are not limited to, left or right hand, skin colour, approximate size (or indication of adult or child hand), configuration of fingers, such as indication of the pinching gesture the fingers are in and how many fingers are applied. However, also other notable descriptors may be applied, such as colour scheme, e.g. a colour of short sleeve, heat sensor reading of the hand, user's voice, thought etc. For example, the controller 130 may be arranged to detect such properties of the input object on the basis of analyzing signals from the proximity detection system 120 and/or further sensors, such as one or more video cameras.

In one embodiment, the apparatus 100 is configured to detect gestures by one or more objects (separately or in combination) in the hovering area 140. For instance, a gesture sensing functionality is activated in response to detecting 300 the hovering object 1. Changes in the proximity sensing field may thus be monitored. A gesture is identified based on the detected changes. An action associated with the identified gestures may then be performed. For example, in response to detecting a gesture similar to movement of a finger when double-clicking a mouse button, a GUI element is selected and a further action is performed for the selected GUI element, e.g. a new application window with contents of a selected URL is displayed. Another example is that the apparatus 100 may be configured to detect movement of an object to form a circle and thus move to a subsequent or preceding view. The hovering gestures may be applied to further control the currently associated information item or display of additional information of the information item. For example, in the example of FIG. 7, a clockwise rotation gesture by the right finger could be associated fast-forwarding of the previewed song. The hovering gesture functionality may be implemented such that a hovering gesture may be associated with different functions depending on the distance of the object to the input surface 112.

Above-illustrated features may be applied for different applications and applications modes. Some examples of applications for which particular advantages are available include browser applications, device management applications, file management applications, media content related applications and services, map applications, applications utilizing augmented reality interactions, social networking applications, and the like.

Figure 8:
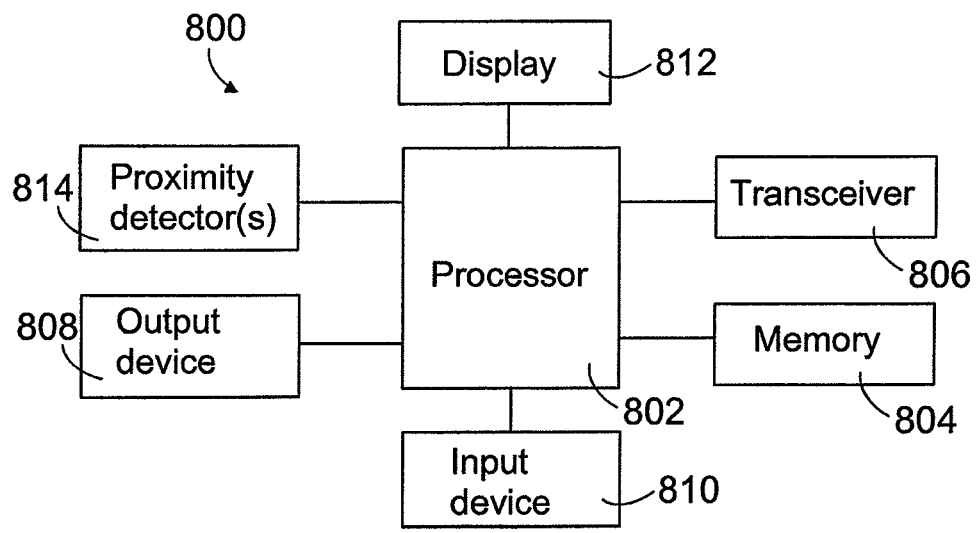
FIG. 8 illustrates an electronic device in accordance with an example embodiment of the invention.

FIG. 8 shows a block diagram of the structure of an electronic device 800 according to an example embodiment. The electronic device may comprise the apparatus 100. Although one embodiment of the electronic device 800 is illustrated and will be hereinafter described for purposes of example, other types of electronic devices, such as, but not limited to, PDAs, pagers, mobile computers, desktop computers, laptop computers, tablet computers, media players, televisions, gaming devices, cameras, video recorders, positioning devices, electronic books, wearable devices, projector devices, and other types of electronic systems, may employ the present embodiments.

Furthermore, the apparatus of an example embodiment need not be the entire electronic device, but may be a component or group of components of the electronic device in other example embodiments. For example, the apparatus could be in a form of a chipset or some other kind of hardware module for controlling by performing at least some of the functions illustrated above, such as the functions of the controller 130 of FIG. 2.

A processor 802 is configured to execute instructions and to carry out operations associated with the electronic device 800. The processor 802 may comprise means, such as a digital signal processor device, a microprocessor device, and circuitry, for performing various functions including, for example, one or more of the functions described in conjunction with FIGS. 1a to 7. The processor 802 may control the reception and processing of input and output data between components of the electronic device 800 by using instructions retrieved from memory. The processor 802 can be implemented on a single-chip, multiple chips or multiple electrical components. Some examples of techniques which can be used for the processor 802 include dedicated or embedded processor, and ASIC.

The processor 802 may comprise functionality to operate one or more computer programs. Computer program code may be stored in a memory 804. The at least one memory and the computer program code may be configured to, with the at least one processor, cause the apparatus to perform at least one embodiment including, for example, control of one or more of the functions described in conjunction with FIGS. 1a to 7. For example, the processor 802 may be arranged to perform at least part of the functions of the controller 130 of FIG. 2. Typically the processor 802 operates together with an operating system to execute computer code and produce and use data.

By way of example, the memory 804 may include non-volatile portion, such as EEPROM, flash memory or the like, and a volatile portion, such as a random access memory (RAM) including a cache area for temporary storage of data. Information for controlling the functionality of the processor 802 could also reside on a removable storage medium and loaded or installed onto the electronic device 800 when needed.

The electronic device 800 may comprise an antenna (or multiple antennae) in operable communication with a transceiver unit 806 comprising a transmitter and a receiver. The electronic device 800 may operate with one or more air interface standards and communication protocols. By way of illustration, the electronic device 800 may operate in accordance with any of a number of first, second, third and/or fourth-generation communication protocols or the like. For example, the electronic device 800 may operate in accordance with wireline protocols, such as Ethernet and digital subscriber line (DSL), with second-generation (2G) wireless communication protocols, such as Global System for Mobile communications (GSM), with third-generation (3G) wireless communication protocols, such as 3G protocols by the Third Generation Partnership Project (3GPP), CDMA2000, wideband CDMA (WCDMA) and time division-synchronous CDMA (TD-SCDMA), with fourth-generation (4G) wireless communication protocols, such as 3GPP Long Term Evolution (LTE), wireless local area networking protocols, such as 802.11, short-range wireless protocols, such as Bluetooth, and/or the like.

The user interface of the electronic device 800 may comprise an output device 808, such as a speaker, one or more input devices 810, such as a microphone, a keypad or one or more buttons or actuators, and a display device 812. The electronic device 800 may comprise a stereoscopic display capable of displaying stereoscopic presentations of UI items, i.e. UI items perceived by the user as three-dimensional (3D) images.

The input device 810 may include a touch sensing device configured to receive input from a user's touch and to send this information to the processor 802. Such touch-sensing device may be configured to recognize also the position and magnitude of touches on a touch sensitive surface. The touch sensing device may be based on sensing technologies including, but not limited to, capacitive sensing, resistive sensing, surface acoustic wave sensing, pressure sensing, inductive sensing, and optical sensing. Furthermore, the touch sensing device may be based on single point sensing or multipoint sensing. In one embodiment the input device is a touch screen, which is positioned in front of the display 812.

The electronic device 800 also comprises a proximity detection system 814, such as the system 120 illustrated earlier, operatively coupled to the processor 802. The proximity detection system 814 is configured to detect when a finger, stylus or other pointing device is in close proximity to, but not in contact with, some component of the computer system including for example housing or I/O devices, such as the touch screen.

The electronic device 800 may comprise also further units and elements not illustrated in FIG. 8, such as further interface devices, further sensors such as an accelerometer sensor, a battery, a media capturing element, such as a camera, video and/or audio module, a positioning unit, and a user identity module.

In some embodiments further outputs, such as an audible and/or tactile output may also be produced by the apparatus 100 on the basis of the detected distance. Thus, the processor 802 may be arranged to control a speaker and/or a tactile output actuator, such as a vibration motor, in the electronic device 800 to provide such further alerting output.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a tangible and non-transitory computer-readable storage medium that may be any media or means that can contain or store the instructions for use by or in connection with an instruction execution system, apparatus, or device, such as a computer.

In one example embodiment, there may be provided circuitry or user interface circuitry configured to provide at least some control functions illustrated above. As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

If desired, at least some of the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one memory including computer program code,
   the at least one memory and the computer program code being configured to, with the at least one processor, cause the apparatus at least to:
   receive an indication of presence of an object hovering in close proximity to an input surface,
   determine at least one information item associated with the object,
   determine distance information based on the distance of the object to the input surface,
   identify a first threshold distance with which the distance information is associated, of at least two threshold distances,
   in response to identifying the first threshold distance, identify a first level of additional information of available information associated with the at least one information item, wherein the first level of additional information is identified from the available information based on relevancy information, wherein at least a second threshold distance is associated with a second level of additional information, and
   cause display of the first level of additional information identified based on the relevancy.

2. The apparatus of claim 1, wherein the apparatus is configured to activate display of and/or adapt amount of information in a preview, recommendation or a supplementary information window associated with the information item on the basis of the distance information.

3. The apparatus of claim 1, wherein the apparatus is configured to:
   determine or detect the relevancy information associated with the at least one information item or one or more further information items associated with the at least one information item.

4. The apparatus of any claim 3, wherein the relevancy information of the at least one information item is determined on the basis of examining access history indicating use of the information item by a user of the apparatus and/or a selected set of further users defined in contact information stored in the apparatus.

5. The apparatus of claim 3, wherein the apparatus is configured to:
   receive an indication that the input object is above a graphical user interface element associated with a plurality of information elements,
   determine or detect relevancy information associated with the plurality of information items, and
   select for display at least one information item associated with the highest relevancy amongst the plurality of information items on the basis of the relevancy information.

6. The apparatus of claim 1, wherein the apparatus is configured to determine the distance on the basis of information from at least one of a video camera, a light level sensor, or an ultrasound sensor.

7. The apparatus of claim 1, wherein the apparatus is a mobile communications device comprising a touch screen.

8. The apparatus of claim 1, wherein the distance information comprises an estimated distance of the object to the input surface.

9. The apparatus of claim 1, wherein the at least one memory and the computer program code are further configured to, with the at least one processor, cause the apparatus to:
   in response to determining that the distance information is associated with at least the second threshold distance, identify a second level of information of the available information associated with the at least one information item, wherein the second level of additional information is identified from the available information based on a different relevancy from the relevancy associated with the first level of additional information; and
   cause display of the second level of additional information based on the relevancy.

10. The apparatus of claim 1, wherein the processor and the at least one memory including computer program code are further configured to cause the apparatus to:
   update relevancy information for the at least one information item based on the presence of the object hovering.

11. The apparatus of claim 1, wherein the relevancy is based on usage history.

12. The apparatus of claim 1, wherein the relevancy is based on usage history by users in a social network of a user of the apparatus.

13. The apparatus of claim 1, wherein the first level of additional information comprises contents of a folder associated with the at least one information item.

14. A method, comprising:
receiving an indication of presence of an object hovering in close proximity to an input surface,
determining at least one information item associated with the object,
with a processor, determining distance information on distance of the object to the input surface,
identifying a first threshold distance with which the distance information is associated, of at least two threshold distances,
in response to identifying the first threshold distance, identifying a first level of additional information of available information associated with the at least one information item, wherein the first level of additional information is identified from the available information based on relevancy information, wherein at least a second threshold distance is associated with a second level of additional information, and
causing display of the first level of additional information identified based on the relevancy.

15. The method of claim 14, wherein display of and/or adaptation of an amount of information is controlled in a preview, recommendation or a supplementary information window associated with the information item on the basis of the distance information.

16. The method of claim 14, wherein relevancy information associated with the at least one information item or one or more further information items associated with the at least one information item is detected or determined, and
the selection of additional information for display is controlled in accordance with the relevancy information.

17. The method of claim 16, wherein the relevancy information of the at least one information item is determined on the basis of examining access history indicating use of the information item by a user of the apparatus and/or a selected set of further users defined in contact information stored in the method.

18. The method of claim 14, wherein the input object is detected above a graphical user interface element associated with a plurality of information elements,
relevancy information associated with the plurality of information items is determined or detected, and
at least one information item associated with the highest relevancy amongst the plurality of information items is selected for display on the basis of the relevancy information.

19. The method of claim 14, wherein the distance is detected on the basis of information from at least one of a video camera, a light level sensor, or an ultrasound sensor.

20. A computer program product comprising a non-transitory computer-readable storage medium bearing computer program code embodied therein for use with a computer, the computer program code comprising:
code for receiving indication of a presence of an object hovering in close proximity to an input surface,
code for determining at least one information item associated with the object,
code for determining distance information on the distance of the object to the input surface,
code for identifying a first threshold distance with which the distance information is associated, of at least two threshold distances,
code for in response to identifying the first threshold distance, identifying a first level of additional information of available information associated with the at least one information item, wherein the first level of additional information is identified from the available information based on relevancy, wherein at least a second threshold distance is associated with a second level of additional information, and
code for causing display of the first level of additional information identified based on the relevancy.

* * * * *